(12) United States Patent
Saarinen et al.

(10) Patent No.: US 7,032,918 B2
(45) Date of Patent: Apr. 25, 2006

(54) STABILIZATION OF AN ARTICULATED VEHICLE

(75) Inventors: Into Saarinen, Pirkkala (FI); Veli-Matti Jortikka, Tampere (FI); Mikko Rahja, Ylöjärvi (FI)

(73) Assignee: John Deere Forestry Oy, Tampere (FI)

( * ) Notice: Subject to any disclaimer, the term of this patent is extended or adjusted under 35 U.S.C. 154(b) by 0 days.

(21) Appl. No.: 10/499,585

(22) PCT Filed: Dec. 19, 2002

(86) PCT No.: PCT/FI02/01045

§ 371 (c)(1),
(2), (4) Date: Jun. 18, 2004

(87) PCT Pub. No.: WO03/055735

PCT Pub. Date: Jul. 10, 2003

(65) Prior Publication Data

US 2005/0092540 A1    May 5, 2005

(30) Foreign Application Priority Data

Dec. 21, 2001 (FI) .................................. 20012545

(51) Int. Cl.
  *B62D 53/00* (2006.01)
(52) U.S. Cl. ............... 280/455.1; 280/474; 280/492
(58) Field of Classification Search ........... 280/455.1, 280/474, 492; 180/124.111, 124.112
  See application file for complete search history.

(56) References Cited

U.S. PATENT DOCUMENTS

| | | | |
|---|---|---|---|
| 3,370,730 A | * | 2/1968 | Fielding .................. 414/715 |
| 3,385,389 A | | 5/1968 | Symons et al. ............ 180/79.2 |
| 4,079,955 A | | 3/1978 | Thorpe et al. .............. 280/111 |
| 4,353,572 A | | 10/1982 | McCain ...................... 280/492 |
| 4,366,966 A | | 1/1983 | Ratsko et al. ............... 280/432 |
| 4,402,522 A | | 9/1983 | Ratsko et al. ............... 280/432 |
| 4,444,409 A | | 4/1984 | Garrison ..................... 280/492 |

(Continued)

FOREIGN PATENT DOCUMENTS

DE    3615071    11/1987

(Continued)

OTHER PUBLICATIONS

International Preliminary Examination Report, Form PCT/IPEA/409, as issued by the Swedish Patent Office in Connection with PCT Application No. PCT/FI022/01045, Feb. 2004.

*Primary Examiner*—Kevin Hurley
(74) *Attorney, Agent, or Firm*—Quarles & Brady LLP

(57) ABSTRACT

A method for stabilizing an articulated vehicle, which articulated vehicle comprises at least a front frame structure and a rear frame structure, and a frame joint structure, which is arranged to couple the frame structures to each other and to allow them to rotate both in relation to each other, away from the normal position, as well as at the same time around an axis, which is substantially parallel to the longitudinal direction of the articulated vehicle. In the method a supporting force is maintained, which force affects between the frame structures and resists the rotation of the frame structures away from normal position, and the maximum of said supporting force is controlled in such a manner that it is dependent on the difference of rotations at least when said difference is increasing and at least when said difference is static.

29 Claims, 3 Drawing Sheets

U.S. PATENT DOCUMENTS

| | | | |
|---|---|---|---|
| 4,469,347 A | 9/1984 | Gier | 280/432 |
| 4,494,765 A | 1/1985 | Ratsko et al. | 280/432 |
| 4,556,231 A | 12/1985 | Schultz | 280/432 |
| 4,583,756 A * | 4/1986 | Hornung et al. | 280/432 |
| 4,756,543 A | 7/1988 | Cromnow et al. | 280/432 |
| 5,328,197 A | 7/1994 | Karilainen et al. | 280/406.1 |

FOREIGN PATENT DOCUMENTS

| | | |
|---|---|---|
| SE | 444 077 | 6/1983 |
| WO | WO 92/11155 | 7/1992 |
| WO | WO 95/17328 | 6/1995 |
| WO | WO 00/35735 | 6/2000 |

\* cited by examiner

STABILIZATION OF AN ARTICULATED VEHICLE

FIELD OF THE INVENTION

The invention relates to a method for stabilizing an articulated vehicle. The invention also relates to a system for stabilizing an articulated vehicle.

BACKGROUND OF THE INVENTION

There are known articulated vehicles, such as harvesters, which move on a terrain and perform harvesting, and which are equipped with a so-called harvester head at the end of a boom assembly for cutting and felling a growing tree stem and for sawing the stem to pieces of desired length. The sawed tree stems are collected with another known working machine that moves on a terrain, wherein the working machine in question is a forwarder equipped with a grapple and the stems are transported in its load space. There are also known combined machines in which the functions of a harvester and a forwarder have been combined, wherein the loading grapple can be replaced with a harvester head that is also suitable for loading or there are several boom assemblies in the machine.

Typically combined machines and forwarders comprise two successive frame structures, which are arranged to turn around a vertical axis and/or rotate around a horizontal axis in relation to each other by means of a frame joint. In forwarders the front frame is supported, for example, by one pair of wheels, and a cabin and a power source are placed thereon. A load space and a boom assembly are placed on top of the rear frame, said boom assembly being located between the cabin and the load space. The rear frame is supported, for example, by two pairs of wheels. The wheels can also be replaced by a bogie, which typically comprises two wheels that sway together.

If the joint allows the frames to rotate, the function in question is typically prevented during the operation when the vehicle is stopped. Thus the frame joint is locked. Such a heavy rear frame and its load are supported and receive supporting force and a support moment from the front frame as well. The supporting forces are finally affected by a wheel, which presses against the ground, or by a mass of another frame alone. Supporting forces are necessary, because the boom assembly is used to handle even heavy tree stems, which may be very far on the side of the vehicle. When the vehicle is mobile, the frame joint is released, and therefore the rear frame cannot lean on the front frame and vice versa. When moving on a terrain, the soil is considerably uneven and the vehicle must be sufficiently stable, because otherwise the unevenness of the terrain can, for example, cause the load space to sway or, in an extreme case, to fall. One critical moment is the start-off at a situation, wherein the center of gravity of the boom assembly and/or the load space has settled in an unfavourable manner and the rear frame leans on the front frame via the frame joint. When the frame joint opens, the supporting forces exit and the load space can fall or sway even fiercely, in which case the sway itself can cause the vehicle to finally fall. The fall is caused, for example, by the weight completely shifting on to the wheels supporting the load space, in which situation the terrain may yield.

A rotating frame joint is introduced in U.S. Pat. No. 4,079,955, wherein the locking is based on the use of a disc brake. U.S. Pat. No. 5,328,197 introduces a forwarder, wherein the frame joint allows rotation around the longitudinal direction and folding around the transverse direction. Rotation is locked by closing the position of cylinders by means of valves. U.S. Pat. No. 4,444,409 also introduces a frame joint of a working machine, wherein free movement is limited by means of mechanical limits. U.S. Pat. No. 4,535,572 introduces a tractor joint, in connection with which are two cylinders by means of which the rotation can be affected, in which case the volume flow coming to or leaving the cylinder is choked. PCT-application WO 00/35735 introduces a frame joint of a special vehicle, which connects two frames and which can be disconnected from one frame. The frame joint includes a cylinder, which takes care of the connection and at the same time functions as a shock absorber.

The shock absorption described above, which is typically based on the choking of air or fluid, affects the stability of a working machine, but prevents the occurrence of violent and fast sways only. The speed of a medium travelling via choking increases if the pressure difference over the choker increases. This means that even in the same rotation position of the frames the intensity of absorption depends purely on the rotation speed and dynamics of the frames, in which case there is necessarily no absorption at all with very slow movement.

During absorption the load and balance situation of the working machine can change, in which case the return to a stable state may be easier. However, if the situation has not changed, the working machine or one of its frame parts falls no matter what, but slower. The shock absorption is based purely on the speed of the absorbed movement, i.e. the rotation speed of the frame parts, but it does not prevent the movement from continuing as slow and, for example, the load space from falling. In this situation the frame joint could naturally be locked, if there is time, but the sway of masses caused by the stopping would cause the load space to finally fall. Thus, according to background art, the frame joints and their shock absorptions do not function in the best possible manner in order to a stabilize the working machine even in states of change. A continuously effective absorption may limit and slow down the normal rotation of the frame parts too much, which then can cause many load variations between different wheels and driving on terrain is disturbed.

SUMMARY OF THE INVENTION

It is an aim of the present invention to remove the aforementioned problems and carry out a system, which generates, between the different frame parts of the working machine, the desired varying supporting force or supporting moment, which is effective even in a completely static situation.

The system functions especially in a situation, wherein the frames rotate heavily away from normal position, but it allows them to return to normal position freely. The supporting force offered by the system also changes the more the further away from normal position the frames move, in which case the normal run of the working machine is not affected with an unnecessarily strong effect, even if the rotation speed is high. With tilting of the working machine the required supporting forces increase, and therefore it is possible with the system to ensure adequate stability for these situations and at the same time to slow down the fast movement. The frame part can rotate and it is allowed to stop, but even then the supporting forces are sustained statically, which differs from normal dynamic absorption. This also means that when starting a drive and when the frame joint is released, the frames have a supporting force in this situation also, if necessary. With the system the working machine is more stable in situations of change, and therefore it is easier to control. In connection with a sway, the movement of the frame is not stopped suddenly, thereby decreasing the danger of falling. Progressive function is especially useful from the point of view of the system. With the presented control circuit it is possible to implement very different controls, which depend on the rotation position.

The invention is suitable for use especially in forwarders, which comprise two connected frames, in which case the cabin and power source are placed in the front frame and the load space for tree stems is in the rear frame. One of more boom assemblies are attached on top of the front or rear frame. The number of wheels supporting the frames varies and instead of them, also a caterpillar track can be used. The invention is preferably applied with cylinder actuators, which are simultaneously used for locking the frame joints.

BRIEF DESCRIPTION OF THE DRAWINGS

In the following, the invention will be described in more detail by a preferred embodiment, wherein reference is at the same time made to the appended drawings, in which.

DETAILED DESCRIPTION OF THE INVENTION

Figure 1:
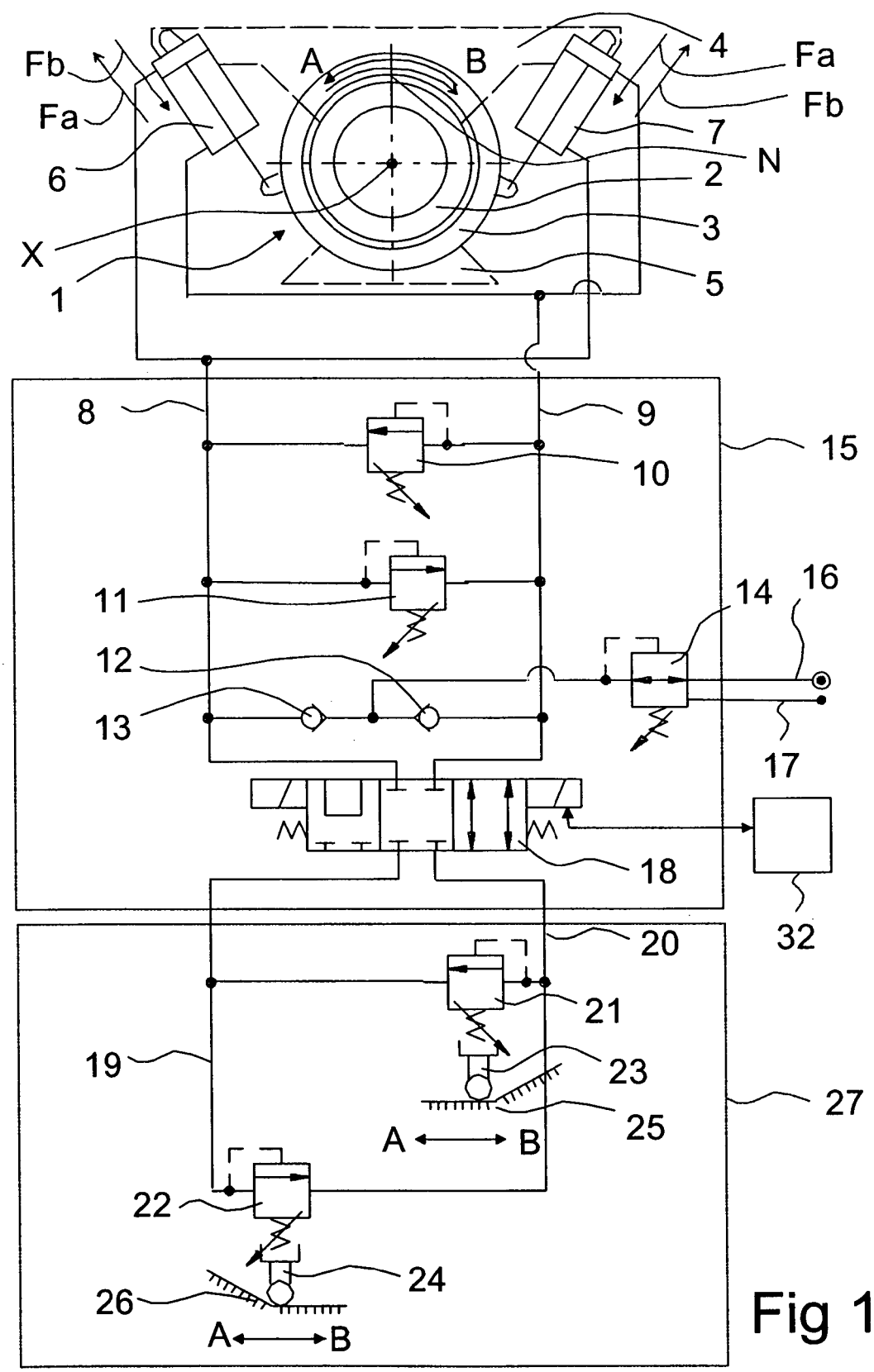
FIG. 1 shows actuator and control means of the system and their arrangements according to the first embodiment of the invention.

The control circuit according to the first embodiment which is applied in the invention is in accordance with FIG. 1. The figure shows a frame joint 1 and the machine in a way that presents the principle of the implementation. A more detailed structure is explained e.g. in connection with this description. Frame joint 1 of the working machine is described with the outer rim 3 and the inner rim 2, which are fitted together with a bearing and which describe a circumferential bearing of the frame joint 1 or a corresponding system and the construction of frame joint 1 connected to it. The outer rim 3 rotates with frame 5 and the inner rim 2 rotates with rear frame 4. If frame 4, which in this case is the rear frame, and frame 5, which in this case is the front frame, in addition rotate around the vertical direction with respect to each other, the outer rim 3 is attached to that part of joint 1, which is attached to front frame 5 by means of a vertical joint. The position of the part in question in relation to front frame 5, and at the same time the position of rims 2, 3 in relation to front frame 5 are controlled, for example, by means of two horizontal pressurized-medium-operated cylinder actuators. The rotation position of rims 2, 3 in relation to rear frame 4 remains the same. At the same time, front frame 5 rotates in relation to rear frame 4 and the direction of motion of the working machine changes. By means of frame joint 1 frames 4, 5 rotate around the horizontal rotation axis X, which at the same time is the longitudinal axis of the working machine.

In the following, we will discuss actuator and control means 6 to 32 of the invention. Locking circuit 15 of the invention is used to control two cylinders 6 and 7, which are operated by a pressurized medium, perform linear reciprocating strokes, and share the load. The system functions with one cylinder as well. They are attached by means of joints, in which case their position is allowed to change when frame joint 1 rotates. They are in a transverse direction in relation to the rotation axis X. Cylinders 6, 7 create the necessary moment of resistance by means of auxiliary circuit 27. Cylinders 6, 7 are attached on one hand to outer rim 3 or some structure, which rotates with outer rim 3, and on the other hand to rear frame 4 or some structure, which rotates with rear frame 4. Cylinders 6, 7 are coupled in such a manner that when cylinder 6 extends, cylinder 7 shortens and vice versa, in which case they typically are at least partly placed on different sides of frame joint 1. In view of operation the position of each cylinder 6, 7 can also be reverse to FIG. 1. In FIG. 1 a pressurized medium input to a first chamber extends the cylinder and correspondingly a pressurized medium input to a second chamber shortens the cylinder.

Each cylinder 6, 7 comprises a first displacement chamber and a second displacement chamber. One of these chambers is a so-called piston rod side chamber. Cylinders 6, 7 are especially so-called frame brake cylinders, between which the medium can move freely through an open valve. The valve is placed in one or two channels, which lead from the inflating chamber to the deflating chamber. Frame joint 1 can be locked so that the valve is closed, in which case travel of the medium and movement of the cylinders is prevented. Thus the outer rim 3 cannot rotate around inner rim 2 either. For example, a directional valve 18 and its central position and left position function as the valve in question.

A working machine typically comprises a control system, which comprises a pressure source or pressure line 16, where the locking circuit 15 of the invention is connected to. A feed valve 14 is typically also between the pressure source 16 and locking circuit 15, which valve is, for example, an adjustable, directly controlled and spring-loaded pressure relief valve, whose function is to maintain the set pressure on lines 8 and 9. Valve 14 is, through check valve 12, connected to line 9, which is connected to the first chamber of cylinder 7 and to the second chamber of cylinder 6. Valve 14 is, through check valve 13, connected to line 8, which is connected to the first volume of cylinder 6 and to the second volume of cylinder 7. Line 9 is connected to line 8 through pressure relief valve 10 and line 8 is connected to line 9 through pressure relief valve 11. Valves 11 and 12 function as so-called shock valves, whose function is to open at a set pressure, if the pressure on line 8 or 9 is too high, for example, from the point of view of the equipment, the control circuit or especially the durability of cylinders 6 or 7. Valves 11, 12 are, for example, spring-loaded valves, which are set mechanically. They set the highest pressure level of control circuit 15.

In the first embodiment of auxiliary control circuit 27, lines 8 and 9 can be connected also by means of a three- or two-positioned four-way directional valve 18, which is typically electrically controlled. Control is provided by control system 32, which is controlled by command of the user of the working machine, which command is, for example, pressing a button, moving a control stick, or in a computerized system, selecting from a menu, which is described in the display means of control system 32. A system already existing in the working machine typically functions as a control system 32, which is modified in such manner that the functions of the invention and the control of the auxiliary control circuit 27 are possible. The left position of directional valve 18 couples lines 8 and 9 together, in which case the rotation of frame joint 1 is free; the middle position closes both lines 8 and 9, in which case the frame joint is locked, because the movement of cylinders 6 and 7 is prevented; and the right position couples lines 8 and 9 to auxiliary control circuit 27, which ensures that the pressure level of lines 8, 9 changes in relation to the rotation position between outer rim 3 and inner rim 2. Thus we discuss especially how much the front frame 5 and rear frame 4 rotate in relation to the known mutual reference or zero-position, which is typically the position wherein the working machine and its frames are on an even base, such as a road.

The basis of control is a relative difference between the rotation of rims 2, 3 and not the absolute number of rotations in-relation to, for example, the horizontal level. In order to determine the relative difference, it is not necessary to use electric sensors, but a simple, purely mechanic solution, which is coupled between the rotating frames 4, 5, is enough. Thus it is a question of, for example, control profiles or profile forms 25, 26, which are placed suitably in relation to the controlled valves 21, 22. By changing the placement, the timing and function of the entire system is controlled in the vicinity of reference position N. The form of profiles 25, 26 control the changes in supporting forces Fa, Fb when the rotation increases and the profiles are more suitably changed. Especially useful is a lever or wedge arrangement, whose position depends on the position of frame joint 1. The adjustment, profile and format of the wedge and lever have a direct effect on what kind of control the valves 21, 22 receive.

The abovementioned reference position can be selected differently as well for special situations, in which case the frame joint comprises an electric sensor system, which is connected to control 32, on the basis of which the relative difference between rims 2, 3 can be determined. Thus, also valves 21, 22 are to be controlled electrically with system 32, because the relation between control and position is not standardized. Reference position N is preferably stable, so that a simple mechanic system can be placed in frame joint 1.

The mechanic system can be replaced partly with, for example, electric limit switches, whose position controls the electrically controlled valves 21 or 22 of the series or their pilot operations to the desired positions in order to create the desired pressure level. The limit switch can be replaced with a sensor, whose position changes by control of stop 25, 26 and which is connected to control system 32. A continuous control is the most suitable type for the invention and a step-like function is implemented by using several limit switches, which replace control 23, 24 and which function at different moments. In frame joint 1, there is, for example, a mechanic stop 25, 26 or a glide, which controls the valve, pilot operation valve, limit switch and for instance the position of the potential divider of the sensor, on the basis of whose signal it is possible to determine the rotation difference. The control of one or more valves 21, 22 of the auxiliary control circuit 27 depends on the position of the potential divider. It is possible to place, for example, a pulse sensor inside the frame joint 1, which sensor moves with the inner rim 2, and the sensor is rotated by a cogging attached on the outer rim 3. Other sensor types are also known, and they are suitable to be placed in frame joint 1 and with them it is possible to determine the relative position of rims 2, 3. A suitable algorithm, chart, formula or the like, which is most suitably modified in the desired manner and on the basis of whose feed signal the output signal controlling the valve means is concluded, is saved in the computer of control system 32. With reference to FIG. 1, for example profile 25 can be attached to valve 21 and the cam roll or stop is attached to the frame. In FIG. 1 valves 21, 22 are attached to the rear frame 4 (or inner rim 2) and profiles 25, 26 are attached to the front frame 5 (or outer rim 3). The purpose of mediums 23 to 26 is to indicate the rotation difference as, for example, pressure, electronic signal, shift and/or position.

Auxiliary control circuit 27 comprises line 19, which can be combined to line 8 with valve 18, and line 20, which can be combined to line 9 with valve 18. Line 19 is connected to line 20 through an adjustable pressure relief valve 22 and line 20 is connected to line 19 through an adjustable pressure relief valve 21. Valves 21, 22 are, for example, spring-loaded valves, which are attached, for example, mechanically. They determine the highest pressure level of control circuit 15 and 27 when valve 18 is in the right position. The pressure level varies depending on the rotation difference and it is lower than the maximum pressure determined by valves 10, 11.

In a mechanical solution stop 25, 26 controls, for example, stem 23, 24, which moves the set spring of valve 21, 22, which determines the pressure level, wherein the valve opens and which at the same time is the maximum pressure level of line 19 (together with line 8) or line 20 (together with line 9). The pressure level, together with the piston cross-section of cylinder 6 or 7, determines force Fa or Fb, with which cylinder 6, 7 affects between frames 4, 5, and therefore the supporting forces are affected at the same time. Valves 21, 22 and cylinders 6, 7 are arranged in such manner that when the rotation difference of frames 4, 5 increases, the pressure level also increases and at the same time supporting force Fa, Fb increases. The direction of influence of supporting force Fa when the direction of rotation is A is marked in FIG. 1, and the direction of influence of supporting force Fb, when the direction of rotation is B. A follower device, for example stem 23, 24 can comprise, for example, a roll, which rolls along profile 25, 26. The form of profile 25, 26 either pushes or pulls the stem or the leverages controlling it, depending on the implementation and where the valves 21, 22 and other parts of the system are placed. For example, valve 21, 22 is attached to rear frame 4 or to inner rim 2 and the wedge, pusher, buffer, or leverage 23 to 26 is attached to front frame 5 or outer rim 3.

Figure 2:
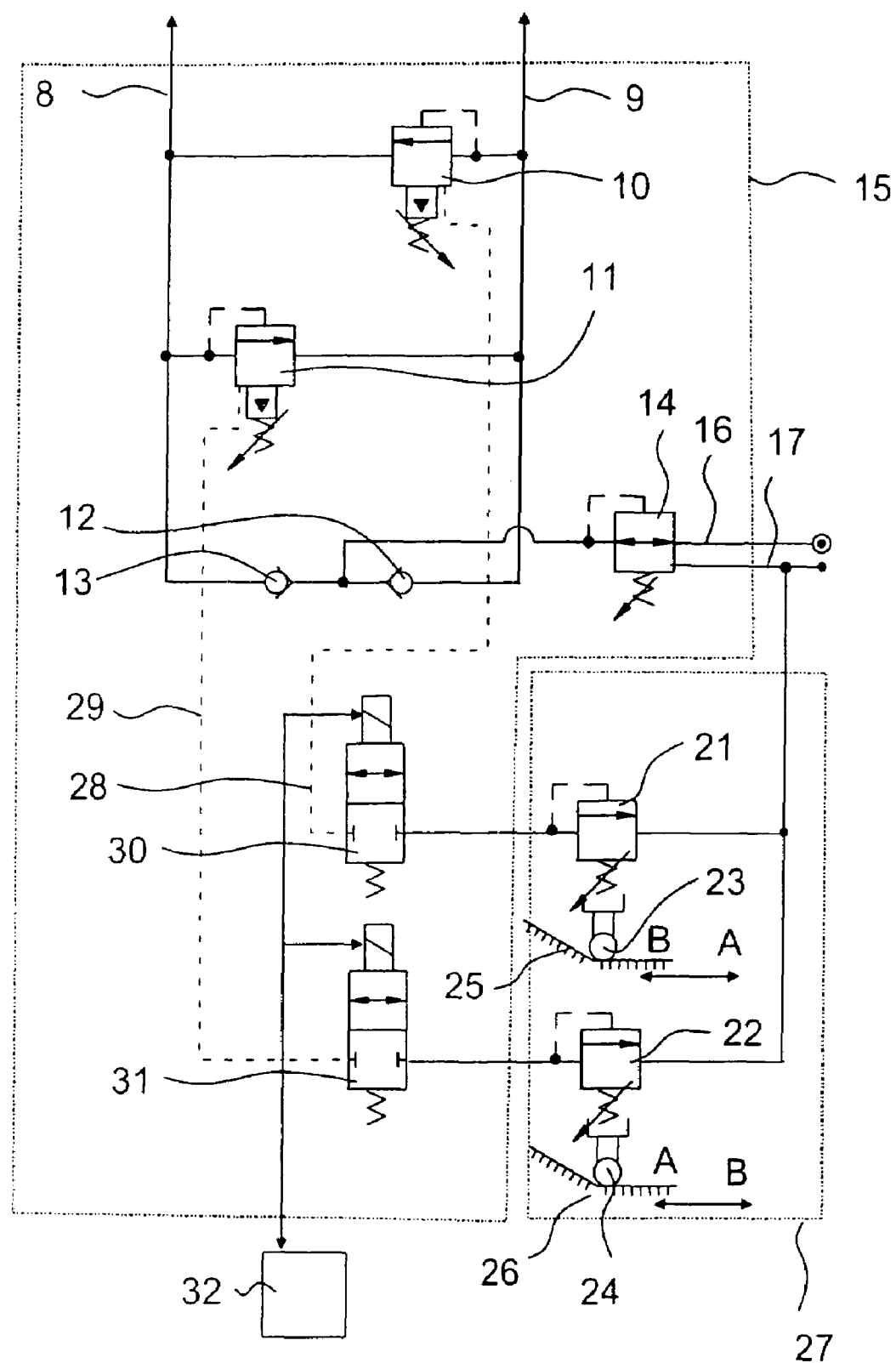
FIG. 2 shows actuator and control means of the system and their arrangements according to the second embodiment of the invention.

FIG. 2 describes the second advantageous embodiment of the auxiliary control circuit 27, wherein pressure relief valve 21 is the pilot valve of valve 10, which controls valve 10 to the desired lower pressure level, which is the pressure level controlling the aforementioned supporting force on line 9. Correspondingly valve 22 is the pilot valve of valve 11, which determines the pressure level of line 10. Thus the pilot operation line 28 is connected to the control connection in valve 10 and pilot operation line 29 is in connection with the control connection in valve 11. Pressure relief valves 21, 22 combine said lines 28, 29 with return line 17, which feeding valve 14 also uses. Each pilot operation line 28, 29 includes, for example, a electrically controlled, normally closed closing valve 30 and 31, which the control system controls similarly to valve 18 in FIG. 1, but without free rotation, and which is opened when the supporting forces controlled by valves 21, 22 are to be turned on. Closing valves 30, 31 can be replaced, for example, by one two-position four-way directional valve, when the free rotation is not taken into use, which is unnecessary when using the supporting forces according to the invention.

In FIG. 1 the different directions of rotation of outer rim 3 are marked with directions A and B. Correspondingly, the corresponding directions are marked with profiles 24, 25. The mutual position of profiles 24, 25 is, in addition, solid, and therefore in FIG. 1 only one profile controls a valve at a time, when the profiles in reference position N do not control the valve. The so-called dead zone around the reference position created with control is managed in such manner that that the mutual position of profiles 24, 25 is changed, in which case the extent of its rotation, during which there is no control, can be managed. By positioning the profiles in such manner that they control the valves simultaneously, there is continuously some control pressure in the circuit. The above-described effects are generated also by placement of limit switches, or by electric control and sensor system, which creates several different control possibilities. The position of profiles in relation to the reference position can be different, in which case when rotating to one direction A, the effect of supporting forces begins earlier than when rotating to the other direction B. Preferably the effect of the supporting forces is symmetric and begins with the same value of rotation A and B. Control circuits 15 and 27 function in such a way, that when the direction of rotation changes, the effect of valve 21 or 22 stops, and thus the supporting force disappears as well, because the direction of movement of cylinders 6, 7 changes. The movement of cylinders 6, 7 forces the medium to another valve 21 or 22, whose control typically has only little effect after the reference position is returned to and the rotation continues even over it.

Figure 3:
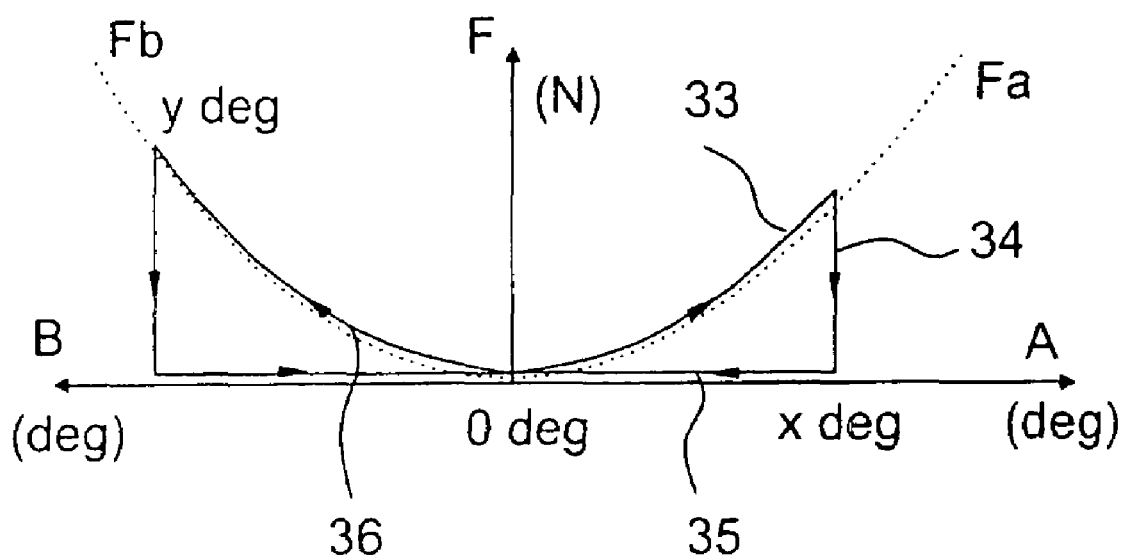
FIG. 3 shows the operating principle of the invention as a graph.

FIG. 3 describes the effect of controls by means of a graph. The horizontal axis shows the difference of rotation of frames 4, 5 as degrees (deg), which in addition depends on direction A and B of movement. The vertical axis shows supporting force F (N, Newton), which is Fa or Fb affecting in frame joint 1. The disclosed control is, according to FIG. 1, preferably progressive, i.e. continuously rising when the difference of rotation increases. The form of control is managed, for example, by forming profiles 25, 26 or, more diversely, in control system 32. When using limit switches, control is step-like and the number of steps varies, but is then preferably rising as well. Graph 33 describes deviation from reference position (0 deg) to direction A, in which case the supporting forces, i.e. the forces Fa resisting the rotation (caused by pressure of line 9) affect in the second chamber of cylinder 6 in FIG. 1 and in the first chamber of cylinder 7, which tend to decrease. Graphs 34 and 35 describe the change of direction to direction B, in which case the first chamber of cylinder 6 and the second chamber of cylinder 7 tend to decrease, which is now resisted by pressure of line 8 (supporting force Fb), but only after the reference position on graph 36, when the control of profile 26 has an effect. This means that the return of frames 4, 5 to the normal position N according to FIG. 1 is not prevented and the supporting forces do not have an effect then. There is a corresponding function when returning from direction B. At the intersection of graphs 33, 34 the rotation movement of frames 4, 5 can also be at rest for a while and the supporting force is continuously on, because the supporting force of the control circuit is thus adequate to cancel external force effects, which tend to rotate the frames. Thus it must be noticed, that external forces maintain pressure in that chamber of cylinder 6, 7 which tends to decrease, in which case the same valve 21 or 22 takes care of controlling the pressure of the medium. Therefore in this situation external forces affect in a way that the difference between rotations tends to increase even if the situation is static, and frame structures 4, 5 still tend to rotate away from normal position.

Movement to graph 34 and 35 takes place for example, after an obstacle is crossed and frame structures tend to return to normal position. At the same time the situation can be such that other forces, such as the supporting forces affecting the wheel, even help the return or they are reversed simply for the reason that the mass center of the vehicle has moved and it causes a stabilizing force or a force affecting in the opposite direction. At the same time, in cylinder 6, 7 a different chamber tends to decrease, but the supporting forces are not transmitted before the normal position is regained or even surpassed.

The invention is not limited solely to the above-presented embodiments, but it can be modified within the scope of the appended claims.

The invention claimed is:

1. A method for stabilizing an articulated vehicle, which vehicle is forest working machine comprising at least:
   a front frame construction and
   a rear frame construction, and
   a frame joint construction, which is arranged to couple the frame structures with each other and to allow their rotation both in relation to each other, away from normal position, and at the same time around a horizontal axis, which is substantially parallel to the longitudinal direction of the articulated vehicle,
   wherein the method comprises the steps of:
   maintaining an increasing supporting force, which supporting force affects between the frame structures, stabilizes the rotating frame structure by resisting the rotation of the rotating frame structure away from said normal position around said horizontal axis, and
   controlling the maximum of said supporting force in such a manner that it depends on the difference of rotations of the frame structures, at least when said difference is increasing, and at least when said difference is static, wherein the supporting force is the greater the greater the difference is.

2. The method according to claim 1, further comprising the step of removing said supporting force at least when said difference is decreasing, and at least when the difference of rotation is static and the frame structures do not tend to rotate away from normal position.

3. The method according to claim 1, wherein the supporting force increases progressively with the increasing difference of rotation.

4. The method according to claim 2, wherein the supporting force increases progressively with the increasing difference of rotation.

5. A system for stabilizing an articulated vehicle, which vehicle is a forest working machine comprising at least:
   a front frame construction and
   a rear frame construction, and
   a frame joint construction, which is arranged to couple the frame structures with each other and to allow their rotation both in relation to each other, away from normal position, and at the same time around a horizontal axis, which is substantially parallel to the longitudinal direction of the articulated vehicle,
   actuator and control means, which are arranged to transfer an increasing supporting force, which affects between the frame structures, stabilizes the rotating frame structure by resisting the rotation of the rotating frame structure away from said normal position around said horizontal axis, and to control the maximum of said supporting force in such a manner that it depends on the difference of rotations of the frame structures, at least when said difference is increasing, and at least when said difference is static, wherein the supporting force is the greater the greater the difference is.

6. The system according to claim 5, wherein the actuator and control means are in addition arranged to couple said supporting force off at least when said difference is decreasing, and at least when the difference of rotation is static and the frame structures do not tend to rotate away from normal position.

7. The system according to claim 5, wherein the supporting force is substantially constant or zero in normal position and around it.

8. The system according to claim 5, wherein the supporting force is arranged to increase progressively with the increasing difference of rotation.

9. The system according to claim 5, wherein the actuator and control means are in addition arranged to lock the frame structures at the desired mutual positions, in which case the difference of rotation cannot change either.

10. The system according to claim 5, wherein the actuator and control means comprise:
    at least one cylinder, which is operated by a pressurized medium and arranged to change its length when the frame structures rotate, and
    at least one controlled pressure valve, which is arranged to limit the maximum pressure of the pressurized medium leaving the cylinder, and at the same time the supporting force in such a manner that the maximum pressure depends on the difference of rotations.

11. The system according to claim 5, wherein the actuator and control means comprise in addition pressurized-medium-operated, electric and/or mechanic means, which are arranged to indicate the difference of rotations.

12. The system according to claim 5, wherein the actuator and control means further comprise:
    a profile form, which moves with the first frame structure, and
    a follower device which moves with the second frame structure, in which case said follower device at the same time moves along said profile form in such a manner that the mutual position of the profile form and the follower device is at the same time dependent on the difference of rotations.

13. The system according to claim 11, wherein the pressurized-medium-operated, electric and/or mechanic means are arranged directly to control at least one pressure valve, which is arranged to limit the maximum pressure of the pressurized medium used in the system, and at the same time the supporting force in such a manner that the maximum pressure depends on the difference of rotations.

14. The system according to claim 5, wherein the frame joint structure comprises:
    a first rim mounted on a bearing, which rotates with the first frame structure, and
    a second rim mounted on a bearing, which rotates with the second frame structure, and
    wherein the actuator and control means comprise at least one cylinder, which is operated by a pressurized medium and arranged to change its length when the frame structures rotate, in which case it is coupled either between the first rim and the second frame structure or the second rim and the first frame structure.

15. The system according to claim 5, wherein the actuator and control means comprise a control system of the articulated vehicle, as whose input is one or more control signals, on the basis of which the difference of rotations can be determined, and as whose output is a second control signal, which corresponds to the desired supporting control system, which algorithm is modifiable and on the basis of which the second control signal can be determined on the basis of said one or more control signals.

16. The system according to claim 5, wherein the articulated vehicle is a first working machine meant to move on terrain, especially a forwarder, in which case the front frame is equipped with a control cabin, the rear frame is equipped with a load space, and one of the frames is, in addition, equipped with at least one turning boom assembly.

17. The system according to claim 5, wherein as a normal position is a position, wherein the frame constructions are when the articulated vehicle is placed on a flat surface.

18. The system according to claim 6, wherein the supporting force is substantially constant or zero in normal position and around it.

19. The system according to claim 6, wherein the actuator and control means comprise:
    at least one cylinder, which is operated by a pressurized medium and arranged to change its length when the frame structures rotate, and
    at least one controlled pressure valve, which is arranged to limit the maximum pressure of the pressurized medium leaving the cylinder, and at the same time the supporting force in such a manner that the maximum pressure depends on the difference of rotations.

20. The system according to claim 9, wherein the actuator and control means comprise:
    at least one cylinder, which is operated by a pressurized medium and arranged to change its length when the frame structures rotate, and
    at least one controlled pressure valve, which is arranged to limit the maximum pressure of the pressurized medium leaving the cylinder, and at the same time the supporting force in such a manner that the maximum pressure depends on the difference of rotations.

21. The system according to claim 10, wherein the actuator and control means comprise in addition pressurized-medium-operated, electric and/or mechanic means, which are arranged to indicate the difference of rotations.

22. The system according to claim 10, wherein the actuator and control means further comprise:
    a profile form, which moves with the first frame structure, and
    a follower device which moves with the second frame structure, in which case said follower device at the same time moves along said profile form in such a manner that the mutual position of the profile form and the follower device is at the same time dependent on the difference of rotations.

23. The system according to claim 12, wherein the pressurized-medium-operated, electric and/or mechanic means are arranged directly to control at least one pressure valve, which is arranged to limit the maximum pressure of the pressurized medium used in the system, and at the same time the supporting force in such a manner that the maximum pressure depends on the difference of rotations.

24. The system according to claim 10, wherein the actuator and control means comprise a control system of the articulated vehicle, as whose input is one or more control signals, on the basis of which the difference of rotations can be determined, and as whose output is a second control signal, which corresponds to the desired supporting control force, in which case a calculation or change algorithm is saved in the control system, which algorithm is modifiable and on the basis of which the second control signal can be determined on the basis of said one or more control signals.

25. The system according to claim 24, wherein the actuator and control means comprise in addition pressurized-medium-operated, electric and/or mechanic means, which are arranged to indicate the difference of rotations, for example, as pressure, electronic signal, shift and/or position.

26. The system according to claim 16, wherein the front frame is equipped with a power source.

27. The system according to claim 11, wherein said pressurized-medium-operated, electric and/or mechanic means are arranged to indicate the difference of rotations as pressure, electronic signal, shift and/or position.

28. The system according to claim 21, wherein said pressurized-medium-operated, electric and/or mechanic means are arranged to indicate the difference of rotations as pressure, electronic signal, shift and/or position.

29. The system according to claim 25, wherein said pressurized-medium-operated, electric and/or mechanic means are arranged to indicate the difference of rotations as pressure, electronic signal, shift and/or position.

* * * * *